United States Patent
Ueda et al.

(10) Patent No.: US 7,730,416 B2
(45) Date of Patent: Jun. 1, 2010

(54) COMMUNICATION APPARATUS AND DISPLAY METHOD

(75) Inventors: Makoto Ueda, Kawasaki (JP); Yoshiaki Hiramatsu, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 360 days.

(21) Appl. No.: 11/453,832

(22) Filed: Jun. 16, 2006

(65) Prior Publication Data

US 2006/0288277 A1    Dec. 21, 2006

(30) Foreign Application Priority Data

Jun. 17, 2005    (JP)    ............................ P2005-178423

(51) Int. Cl.
*G06F 3/048*    (2006.01)
*G06F 3/00*    (2006.01)

(52) U.S. Cl. ........................ 715/788; 715/733; 715/781

(58) Field of Classification Search ................. 715/234, 715/243, 788, 790, 802, 781, 760, 733
See application file for complete search history.

(56) References Cited

U.S. PATENT DOCUMENTS

| | | | |
|---|---|---|---|
| 5,751,959 A * | 5/1998 | Sato et al. ................... | 709/205 |
| 6,600,500 B1 * | 7/2003 | Yamamoto .................. | 715/795 |
| 7,099,829 B2 * | 8/2006 | Gomez ....................... | 704/275 |
| 7,117,452 B1 * | 10/2006 | Pavelski et al. ............. | 715/792 |
| 7,162,717 B1 * | 1/2007 | Harris ........................ | 717/168 |
| 2003/0055736 A1 | 3/2003 | Eldridge et al. | |
| 2003/0088413 A1 | 5/2003 | Gomez | |
| 2004/0054968 A1 * | 3/2004 | Savage ....................... | 715/513 |
| 2005/0223062 A1 * | 10/2005 | Doan et al. ................. | 709/206 |
| 2005/0283739 A1 * | 12/2005 | Mohr et al. ................. | 715/800 |
| 2006/0036703 A1 * | 2/2006 | Fulmer et al. ............... | 709/207 |
| 2006/0129948 A1 * | 6/2006 | Hamzy et al. ............... | 715/790 |

FOREIGN PATENT DOCUMENTS

| | | |
|---|---|---|
| EP | 1 223 518 A2 | 7/2002 |
| EP | 1 764 673 A1 | 3/2007 |
| JP | 2001-249874 | 9/2001 |

(Continued)

OTHER PUBLICATIONS

Microsoft® Windows Version 5.1, copyright 2001, screenshots 1-4.*

*Primary Examiner*—Ting Lee
(74) *Attorney, Agent, or Firm*—Oblon, Spivak, McClelland, Maier & Neustadt, L.L.P.

(57) ABSTRACT

A communication apparatus and display method are capable of displaying one frame of a plurality of frames, and displaying automatically an appropriate frame for a user in the case that there are changes in display contents. A display part displays screen data while enlarging a frame which is specified by the user and is included in Web data including a plurality of frames received by a data communicating part. While the screen data of the frame specified by the user is displayed, a frame configuration management part judges that changes took place in display contents of other frames that are not displayed. A data processing part performs data processing so as to cause all frames included in the received Web data to be displayed on the display part when it is judged that the changes took place in the display contents.

8 Claims, 8 Drawing Sheets

FOREIGN PATENT DOCUMENTS

| | | |
|---|---|---|
| JP | 2002-373043 | 12/2002 |
| JP | 2003-122770 | 4/2003 |
| JP | 2003-167763 | 6/2003 |
| JP | 2004-246822 | 9/2004 |
| TW | 589556 | 6/2004 |

* cited by examiner

```
<HTML>
<HEAD><TITLE>7FRAME PAGE</TITLE></HEAD>
<FRAMESET rows="20%,80%">
 <FRAME src="frame1.html"name="frame1">
 <FRAMESET cols="30%,70%">
  <FRAME src="frame2.html"name="frame2">
  <FRAME src="frame3.html"name="frame3">
 </FRAMESET>
</FRAMESET>
<NOFRAMES>BROWSE WITH A FRAME-COMPLIANT BROWSER</NOFRAMES>
</HTML>
```

COMMUNICATION APPARATUS AND DISPLAY METHOD

BACKGROUND OF THE INVENTION

1. Field of the Invention

The present invention relates to a communication apparatus and a display method of Web data including a plurality of frames.

2. Related Background of the Invention

A technology described in Patent Document 1 (Japanese Patent Application Laid-Open No. 2003-122770) is known as a technology that can display arbitrary one frame in received Web data including a plurality of frames in a whole display screen of an information apparatus with a small display screen such as a mobile terminal. Patent Document 1 describes that, when the received Web data includes a plurality of frames, title information is first displayed and then text is displayed by user's operation using the whole screen.

A display method described in Patent Document 1 is effective for a terminal provided with a small display screen such as a mobile terminal because one frame is caused to be displayed using the whole display screen. However, when Web data in which frames are caused to be associated with each other and a result of operation within one frame can be reflected in display contents of another frame is handled, the aforementioned display method is user-unfriendly. That is, there is a problem that, even if display contents in another frame that is not displayed has changed, the user cannot know that the display contents have changed.

Therefore, an object of the present invention is to provide a communication apparatus and a display method that display one frame of a plurality of frames and, when there are changes in display contents, can automatically display an appropriate frame for the user.

SUMMARY OF THE INVENTION

To solve the aforementioned problem, a communication apparatus according to the present invention comprises: a reception means for receiving Web data including a plurality of frames displaying screen data; a display means for displaying the screen data while enlarging a frame which is specified by a user and is included in the Web data received by the reception means; a judgment means for judging whether or not, while the screen data of the frame specified by the user is displayed with the display means, changes took place in display contents of other frames that are not displayed; and a data processing means for causing all frames included in the Web data received by the reception means to be displayed on the display means when the judgment means judges that changes took place in the display contents.

A display method according to the present invention which is a display method of a communication apparatus provided with a display means for displaying received Web data, comprising the steps of: receiving the Web data including a plurality of frames displaying a screen data as a reception step; displaying the screen data on the display means while enlarging the frame which is specified by the user and is included in the Web data received at the reception step as a display step; judging whether or not changes took place in display contents of other frames that are not displayed, while the screen data of the frame specified by the user is displayed at the display step as a judgment step; and causing all frames included in the Web data received at the reception step to be displayed on the display means, when the judgment step judges that the changes took place in display contents, as a data processing step.

According to the present invention, Web data including a plurality of frames displaying screen data is received, the screen data is displayed while enlarging a frame specified by a user and included in the received Web data; judgment is performed whether or not changes took place in display contents of other frames that are not displayed while the screen data of the frame specified by the user is displayed, and when it is judged that the display contents changed, it is possible to cause all frames included in the received Web data to be displayed.

Due to this, it is possible to display the screen data of the other frame in which the changes took place in the display contents in the state that one frame is displayed, so that the user can find immediately that the changes took place in which frame. Thus, a user-friendly communication apparatus can be provided.

Further, it is preferable that the above judgment means of the communication apparatus according to the present invention further judges whether the frame display contents changed without user's operation or whether the frame display contents changed due to user's operation; and the data processing means; in the case that the judgment means judges that the changes took place in the display contents due to the user's operation, causes all frames of the Web data to be displayed on the display means; in the case that the judgment means judges that the changes took place in the display contents of the frame without the user's operation, causes the frame specified by the user to be displayed continuously; and instead of, in the case that the judgment means judges that the changes took place in the display contents, carrying out processing such that all frames included in the Web data received by the reception means are caused to be displayed on the display means.

Furthermore, it is preferable that the above judgment step of the display method according to the present invention further judges whether the frame display contents changed without user's operation or whether the frame display contents changed due to user's operation; and the data processing step: in the case that the judgment step judges that the changes took place in the display contents due to the user's operation, causes all frames of the Web data to be displayed on the display means; in the case that the judgment step judges that the changes took place in the display contents of the frame without the user's operation, causes the frame specified by the user to be displayed continuously; and instead of, in the case that the judgment step judges that the changes took place in the display contents, carrying out replacement of processing such that all frames included in the Web data received at the reception step are caused to be displayed at the display step.

According to the present invention, further, judgment is performed whether changes took place in the display contents of the frame without user's operation or whether changes took place in the display contents of the frame due to user's operation; and it is possible to cause all frames of the Web data to be displayed when it is judged that the changes took place in the display contents of the frame due to the user's operation, while it is possible to cause the frame specified by the user to be displayed continuously when it is judged that the changes took place in the display contents of the frame without the user's operation.

Due to this, it is possible to prevent the user from being confused due to a sudden change of screen display when the changes took place in the display contents of the frame without user's operation. Conversely, when frame display contents were changed by user's operation, the user can be informed of the frame where the changes took place without causing any confusion because there is a possibility that the user be aware of the change of screen display.

Moreover, it is preferable that the judgment means of the communication apparatus according to the present invention further judges whether or not changes took place in own frames or other frames displayed with the display means, and the data processing means, when the judgment means judges that the changes took place in the own frames or the other frames, causes all frames included in the Web data received with the reception means to be displayed on the display means.

According to the present invention, when it is judged that the changes took place in the displayed frame or other frames, all frames included in the received Web data are caused to be displayed. Due to this, it is possible to inform the user of the frame where the changes took place without judging presence/absence of user's operation.

The present invention is capable of displaying the screen data of the frame where the changes took place and informing the user that the changes took place in which frame.

DESCRIPTION OF THE PREFERRED EMBODIMENTS

The present invention can easily be understood by considering detailed descriptions below with reference to drawings attached for exemplification of an embodiment. Subsequently, the embodiment of the present invention will be described below with reference to attached drawings. Like numerals are attached to like parts, if possible, and overlapped descriptions are omitted.

Figure 1:
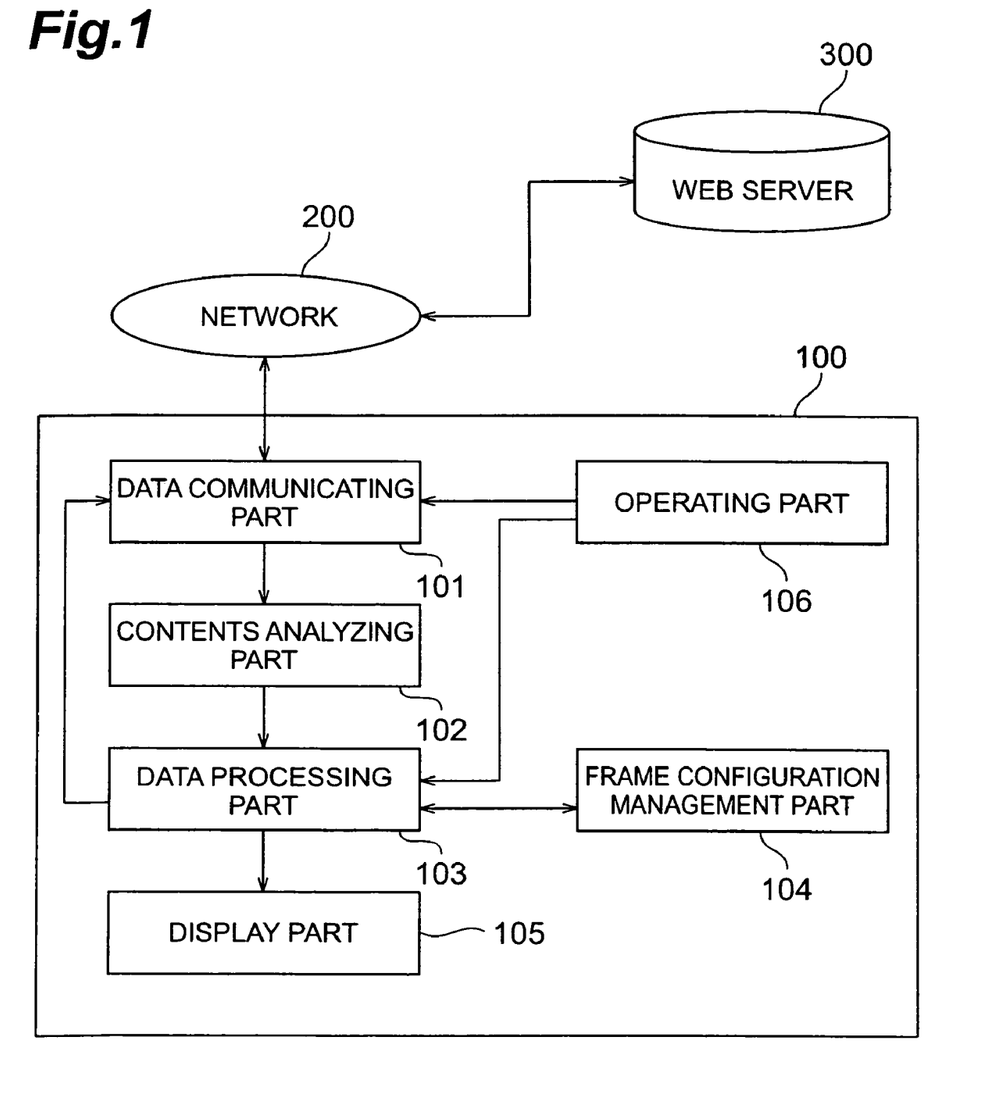
FIG. 1 is a block configuration diagram illustrating functions of a mobile device 100 in the present embodiment.

FIG. 1 is a block configuration diagram showing functions of a mobile device 100 in the present embodiment. As shown in FIG. 1, the mobile device 100 is composed of hardware such as CPU, ROM, and RAM, and as the functions thereof it is configured by including a data communicating part 101 (reception means), a contents analyzing part 102, a data processing part 103 (data processing means), a frame configuration management part 104 (judgment means), a display part 105 (display means), and an operating part 106, allowing acquisition of Web data including a plurality of frames from a Web server 300. Each component will be described below.

The data communicating part 101 is one for communicating with the Web server 300 using data via a network 200 and acquires Web data including a plurality of frames from the Web server 300 to output the acquired Web data to the contents analyzing part 102.

The contents analyzing part 102 is one that analyzes the Web data acquired by the data communicating part 101 and, based on this analysis, performs acquisition of contents. Specifically, the contents analyzing part 102 judges whether or not the Web data has a data format in which data is divided into frames. The contents analyzing part 102, when judges that, based on this judgment result, the Web data is divided into a plurality of frames, performs acquisition processing of contents described in each frame (such as an html file and image file). After performing the acquisition processing, the contents analyzing part 102 further analyzes contents in each frame and further judges whether or not one frame is divided into a plurality of frames.

In this way, the contents analyzing part 102 judges presence/absence of division on all frames included in the received Web data, outputs acquired contents for each frame to the data processing part 103, and causes the display part 105 to display the contents.

The contents analyzing part 102, when judges that frames are not divided, performs acquisition processing of contents described in the Web data, outputs the contents to the data processing part 103, and causes the display part 105 to display the contents.

Figure 2:
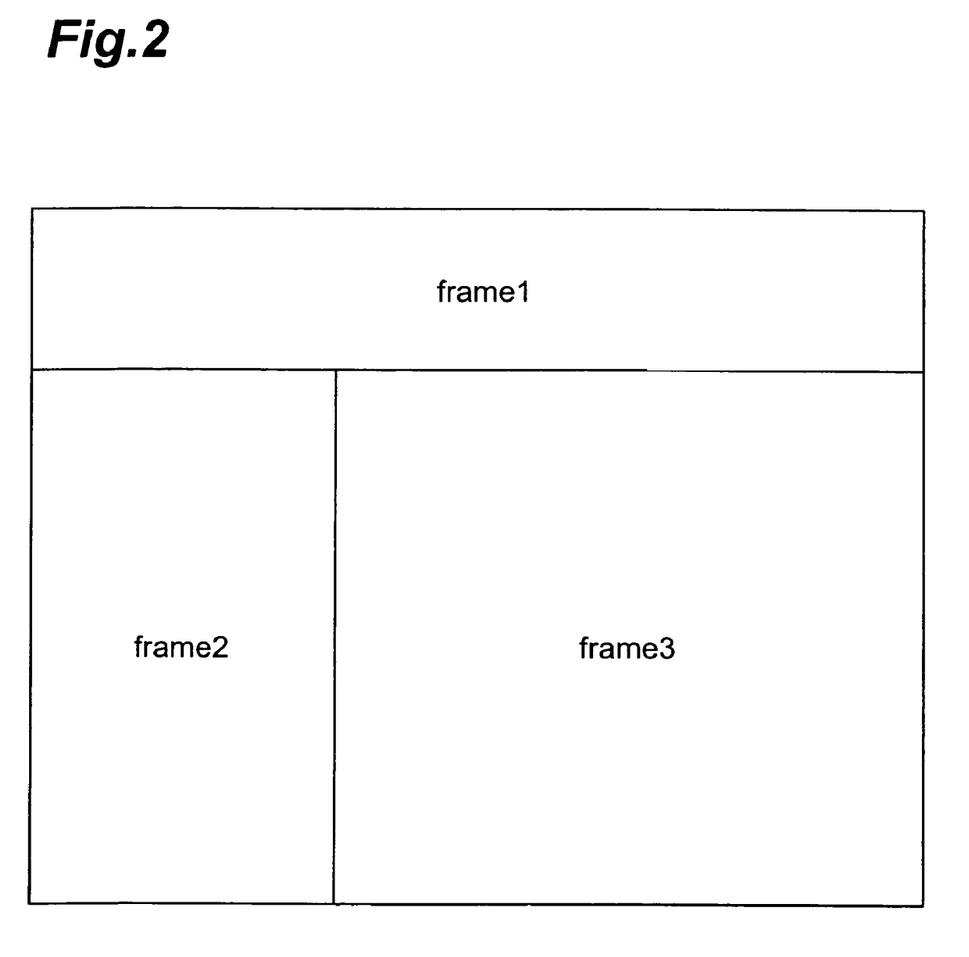
FIG. 2 is a schematic diagram showing an outline of a frame configuration of Web data.

Here, a method for judging presence/absence of frame by the contents analyzing part 102 will be described. FIG. 2 is a schematic diagram showing an outline of a frame configuration of Web data and FIG. 3 is an explanatory diagram showing source code of the Web data.

Figure 3:
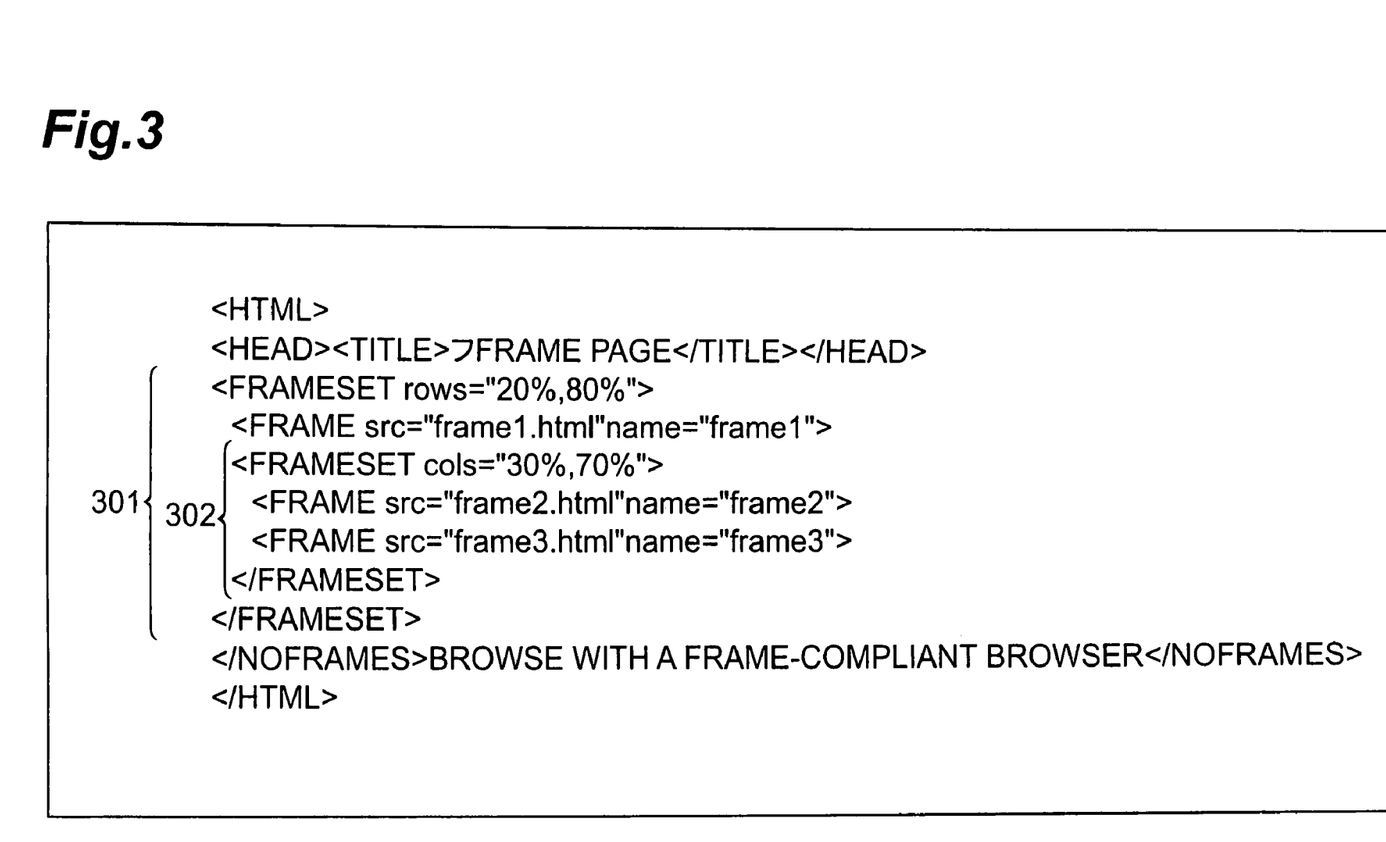
FIG. 3 is an explanatory diagram showing a source code of the Web data.

As shown in FIG. 2, the Web data configured from frame1 to frame3 is configured so that frame division should be created using the source code shown in FIG. 3. In FIG. 3, a description part 301 defines that a character string described between "FRAMESET" and "/FRAMESET" be handled as a frame and frame1.html corresponding to frame1 is described. Furthermore, in FIG. 3, a description part 302 is described in the description part 301 and "FRAMESET" and "/FRAMESET" are described in the description part 302, indicated is that a divided frame is further divided. Here, frame2.html and frame3.html corresponding to frame2 and frame3 respectively are described in the description part 302.

In this way, the contents analyzing part 102 can judge existence of the frames by recognizing "FRAMESET" and "/FRAMESET". Then, the data processing part 103 fetches an html file specified by the user and described as a divided frame. The data processing part 103 can cause only one frame to be displayed on the display part 105 while enlarging it by rewriting a source code of the Web data so as to display only the fetched html file or by creating new source code.

Descriptions of each component will continue by returning to FIG. 1. The data processing part 103 is one for performing data processing such as script processing to cause the Web data output by the contents analyzing part 102 to be displayed on the display part 105 and outputs the data-processed Web data to the display part 105.

Further, the data processing part 103 outputs an instruction to the data communicating part 101 so as to perform update processing of Web data or frames within the Web data based on an operation instruction output by the operating part 106. Then, by receiving new Web data or new data to be displayed in a frame via the contents analyzing part 102, the data processing part 103 performs update processing of the Web data or data to be displayed in a frame.

Moreover, the data processing part 103, when receives an instruction to enlarge one frame in the Web data and display data included in the frame by an operation instruction output from the operating part 106, fetches an html file corresponding to the selected one frame from the source code. Then, the data processing part 103 outputs only the fetched html file to the display part 105. Due to this, the displayed data is displayed in the state that the frame is enlarged, making it easier for the user to view.

The frame configuration management part 104 is one that judges whether or not the changes took place in display contents of other frames not displayed of the Web data displayed on the display part 105. For example, the frame configuration management part 104 judges that there was change processing of the display contents of the frame other than the displayed frame by judging that the user pressed an anchor. Incidentally, when change processing was performed by pressing an anchor, the frame configuration management part 104 judges that change processing in another frame was performed by using a target attribute described in the frame. In addition, the frame configuration management part 104 judges that change processing of the display contents of a frame was performed by judging that processing in which a Web data change in a specific method (such as Location.href) of JavaScript is indicated was performed. Furthermore, the frame configuration management part 104 uses a refresh attribute of a META tag to judge that change processing of the display contents of a frame has been performed after elapsing a predetermined time period by timer control.

As described above, the frame configuration management part 104, when judges that display contents of another frame that is not displayed on the display part 105 changed, outputs an instruction to the data processing part 103 to switch the frame to be displayed. Upon receipt of the switching instruction from the frame configuration management part 104, the data processing part 103 outputs acquired Web data including all frames to the display part 105 such that all frames included in the received Web data are displayed.

Furthermore, when judging whether or not display contents of frames changed, the frame configuration management part 104 judges whether other frames including the own frame currently displayed on the display part 105 changed or whether other frames only changed. The frame configuration management part 104, when judges that other frames including the own frame changed, performs switching processing of the display screen so that all frames are displayed. Further, the frame configuration management part 104, when judges that other frames only changed, as described below, judges whether the changes took place automatically or manually, and then performs processing appropriate for the user in each case.

Furthermore, when judging whether or not display contents of frames changed, the frame configuration management part 104 judges whether the display contents of the other frames changed due to selection of an anchor described in one frame of Web data by the user or whether the display contents of the other frames changed automatically due, for example, to a predetermined elapsed time period. That is, when the display contents of a frame changed, the frame configuration management part 104 judges whether the change occurred automatically or by user's operation.

The frame configuration management part 104, when judges that the display contents of the frame changed by user's operation, outputs an instruction to the data processing part 103 so as to display the Web data including all frames on the display part 105. Further, the frame configuration management part 104, when judges that the display contents of the frame changed automatically, causes the contents currently displayed to be displayed while continuing as it is without changing the display contents on the display part 105.

The display part 105 is one for displaying Web data which is subjected to display control by the data processing part 103.

The operating part 106 is one for receiving the operations of the mobile device 100 by the user while the operating part 106 is the part composed of, for example, a ten-key pad, a cross key, and other functional keys. Based on a user's instruction received by the operating part 106, the data communicating part 101 performs acquisition processing of Web data from the Web server 300 and the data processing part 103 performs selection processing of an anchor described in Web data subjected to display control, thus makes it possible to perform acquisition processing of the Web data or the frames.

The mobile device 100 thus configured receives Web data including a plurality of frames, selects arbitrary frame of a plurality of frames, and displays only the data included in the selected frame on the display part 105, thereby allowing enlarged display of the data. Furthermore, the mobile device 100, in the case that the changes took place in the display contents of a frame, can execute appropriate processing for the user in such a way that all frames are displayed in view of user operability or change processing is performed in the background without displaying them on the display part 105.

Figure 4:
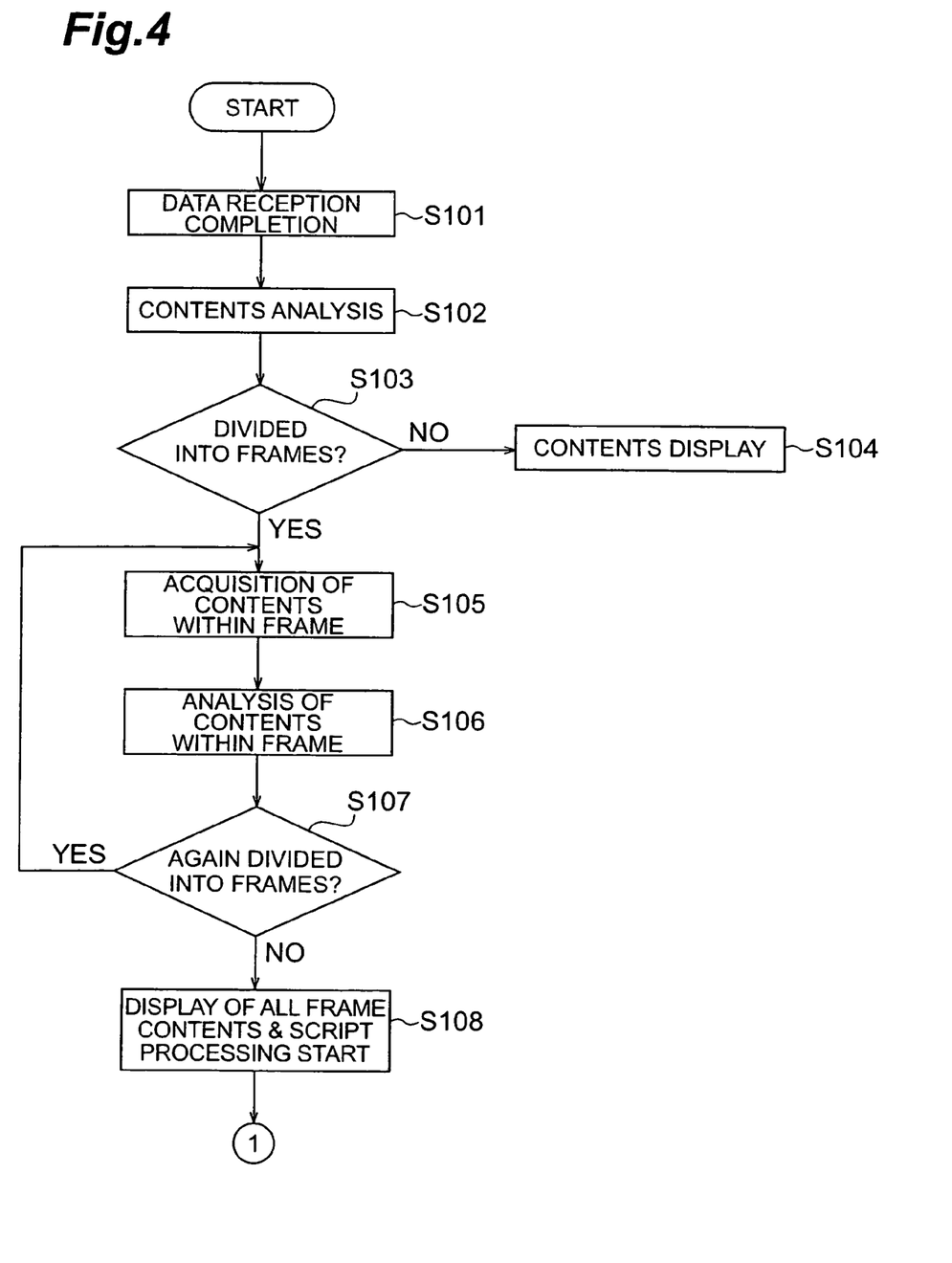
FIG. 4 is a flow chart showing an operation when judging presence/absence of frame division.

Next, operations of the mobile device 100 thus configured will be described below. FIG. 4 is a flow chart showing an operation when judging presence/absence of a frame division in the mobile device 100 according to the present embodiment. A Web data is received by the data communicating part 101 of the mobile device 100 (S101). Then, contents included in the received Web data are analyzed by the contents analyzing part 102 (S102). Then, whether or not the received Web data is divided into a plurality of frames is judged by the contents analyzing part 102 (S103). Here, as described above, the contents analyzing part 102 judges whether or not the frame is divided based on "FRAMESET" and "/FRAMESET" described in the Web data.

Here, the contents analyzing part 102, when judges that the Web data has no description of "FRAMESET" or "/FRAMESET" and thus no frame division (S103: No), performs acquisition processing of image files and others described in the Web data. Then, the files and Web data acquired by the contents analyzing part 102 are output to the data processing part 103. After that, data processing and script processing are performed by the data processing part 103 and the Web data is displayed on the display part 105 (S104).

In S103, the contents analyzing part 102, when judges that the received Web data is divided into a plurality of frames (S103: Yes), performs acquisition processing of html files described in the Web data or image files or the like (S105), and further performs an analysis of frame contents (S106). Here, whether or not one frame is further divided into a plurality of frames is judged by the contents analyzing part 102 (S107). When the contents analyzing part 102 judges that a frame is further divided (S107: Yes), contents in the frame are acquired after returning to S105. In this way, all frames included in the Web data are recognized by the contents analyzing part 102, and at the same time, contents such as html files and image files included in frames are acquired.

When acquisition of contents such as html files and image files included in each frame is performed, the Web data composed of these frames is displayed on the display part 105 after undergoing data processing and script processing by the data processing part 103 (S108).

Figure 5:
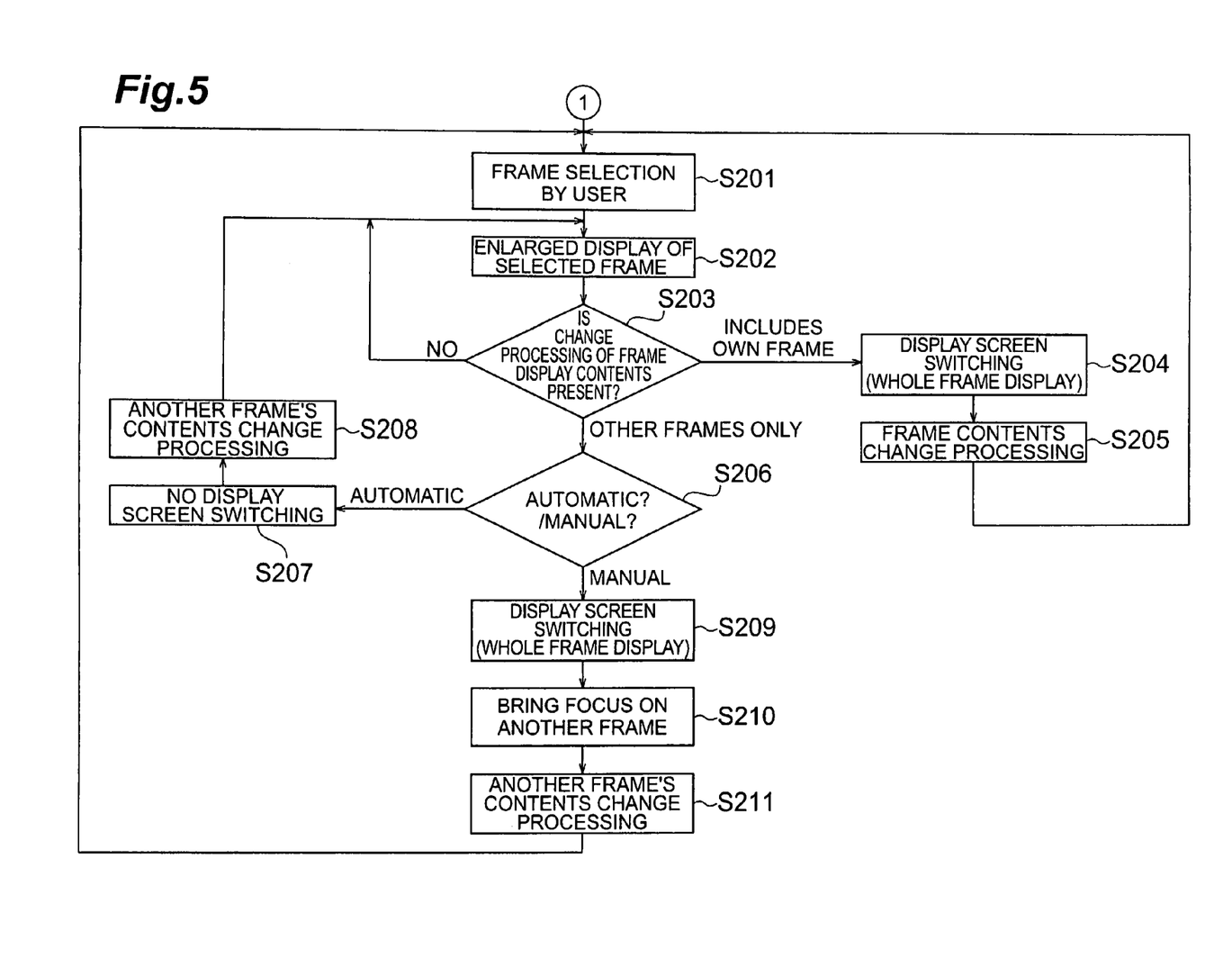
FIG. 5 is a flow chart showing an operation when a change occurs in other frames.

Next, there will be described operations when the changes took place in other frames while only one frame specified by the user is enlarged for display in the mobile device 100. FIG. 5 is a flow chart of an operation when the changes took place in other frames in the mobile device 100.

By user's operation of the operating part 106, one frame is selected from all frames included in the received Web data (S201). The data processing part 103 judges that one frame is selected. Then, the data processing part 103 outputs an html file corresponding to the one frame to the display part 105 so that only the selected one frame is enlarged and data of the one frame is displayed on the display part 105. Thus, the selected frame is enlarged and the data of the frame is displayed on the display part 105 (S202). In the present embodiment, data will be displayed using the whole screen of the display part 105 and, as a result, the same technological effect as an enlarged frame will be achieved.

Figure 6:
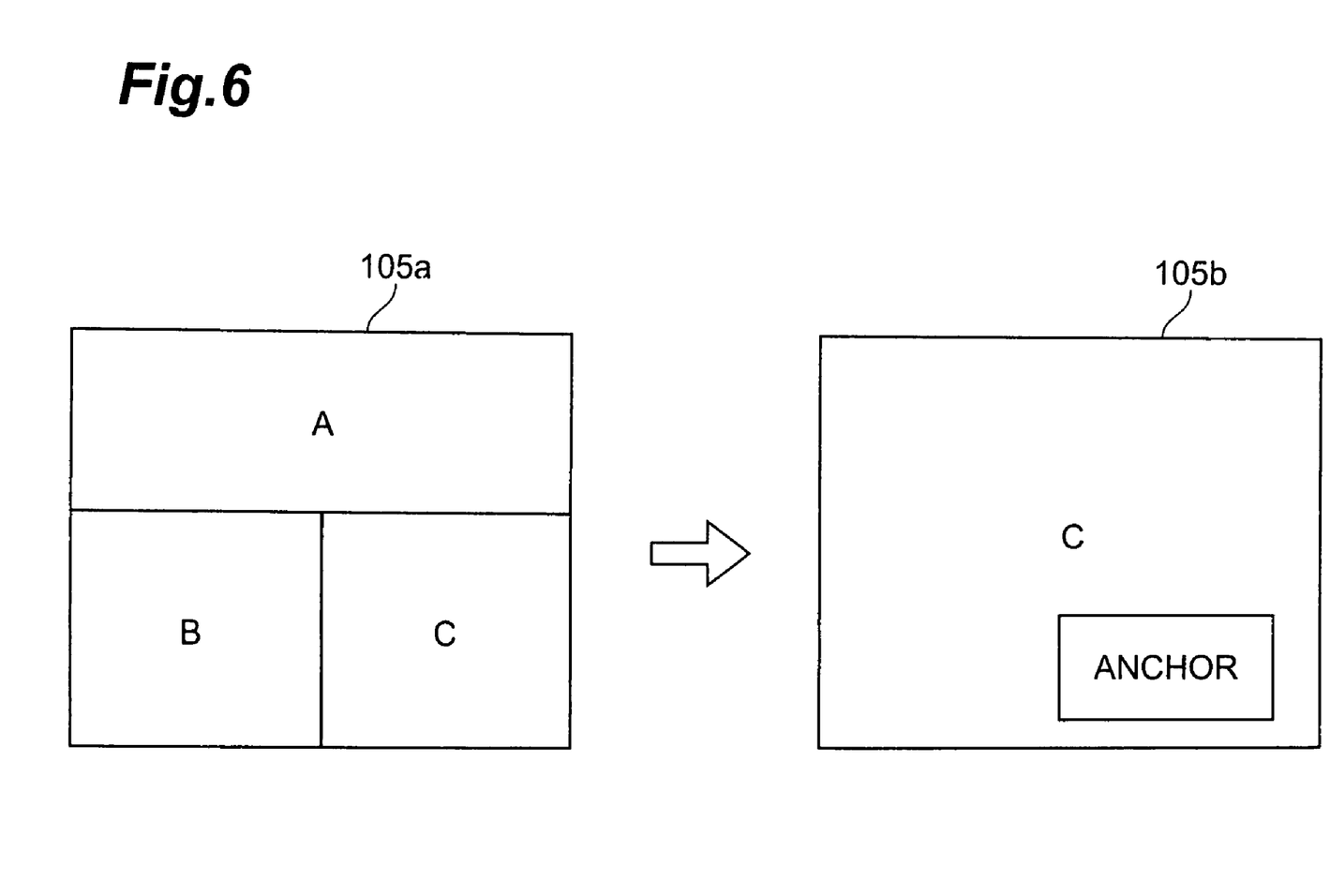
FIG. 6 is an explanatory diagram showing a screen transition example when only Frame C is enlarged for display.

Here, a transition example of display screen when processing is performed at S201 and S202 will be described. FIG. 6 is an explanatory diagram showing a screen transition example when only Frame C is enlarged for display. As shown in FIG. 6, a display screen 105*a* of the Web data including three frames is displayed on the display part 105. Here, when Frame C is selected by user's operation, the data processing part 103 performs processing so that only Frame C is displayed on the display part 105, and the Frame C as a display screen 105*b* will be displayed on the display part 105.

Descriptions of operations will continue by returning to FIG. 5. Next, in the state that only the one frame is enlarged and displayed, the frame configuration management part 104 judges whether or not change processing of the display contents of other frames that are not displayed was performed (S203). Here, it is judged that change processing of the frame display contents was performed based on the fact that the frame configuration management part 104 judges that the user pressed an anchor. Incidentally, in the case that there is the change processing by pressing an anchor, the frame configuration management part 104 judges by using the target attribute described in the frame that there is the change processing in the other frames. In addition, it is judged that the change processing of the display contents of the frame was performed based on the judgment by the frame configuration management part 104 that processing in which a Web data change in a specific method (such as Location.href) of JavaScript is indicated was performed. Furthermore, the frame configuration management part 104 judges that the processing was performed which indicates existence of the change processing in the display contents of the frame after elapsing predetermined time period with the timer control upon using the META tag refresh attribute.

When the frame configuration management part 104 judges that the change processing of the display contents of other frames including the own frame displayed currently on the display part 105 was performed (S203: Includes own frame), a source code is rewritten by the data processing part 103 so as to display all frames included in Web data, and display data based on the source code is output to the display part 105, so that the Web data including all frames is displayed on the display part 105 (S204). Then, frame contents change processing such as acquisition processing and display processing of contents in each frame is performed by the data processing part 103 (S205).

Figure 7:
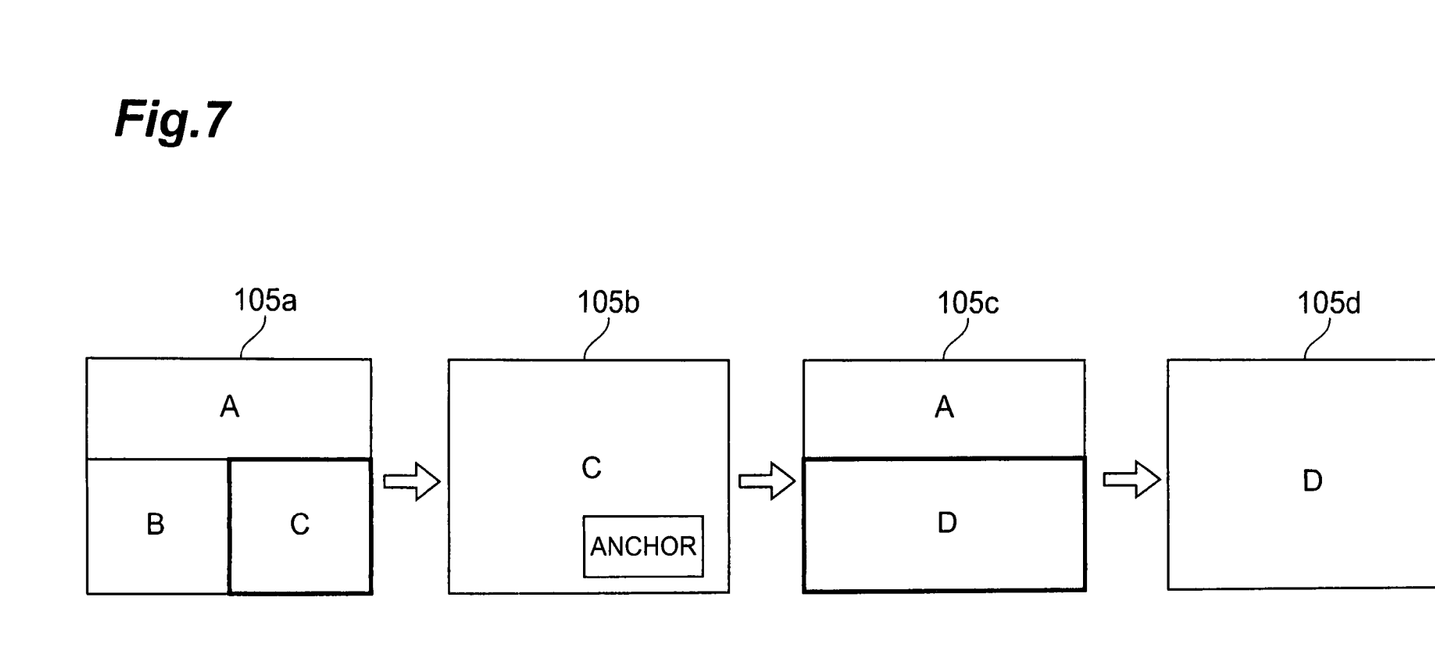
FIG. 7 is an explanatory diagram showing a transition example of display screen when there is change processing of display contents of frames including Frame C in the state of enlarging to display Frame C.

Here, a transition example of the display screen when displayed in S201 to S204 will be described. FIG. 7 shows a transition example of the display screen when change processing of display contents of other frames (for example, Frame A or B) including Frame C was performed in the state that Frame C is enlarged for display. The display screen of the display part 105 is shifted to the display screen 105*a*, and the display screen 105*b* (refer to S202). Then, when the anchor described in Frame C and shown in the display screen 105*b* is selected by user's operation, a display screen 105*c* is displayed on the display part 105 (refer to S204). The display screen 105*c* is composed of Frame A and Frame D; and the Frame D is displayed instead of Frames B and C. Here, when the user makes a selection of enlarged display of Frame D, Frame D is enlarged for display, as shown in a display screen 105*d*.

Descriptions of operations will continue by returning to FIG. 5. In S203, the frame configuration management part 104, when judges that change processing of other frames excluding the own frame currently displayed on the display part 105 was performed (S203: Other frames only), further judges whether the change processing was performed automatically or manually (S206). When the frame configuration management part 104 judges in S206 that the change processing of frame display contents was performed automatically (S206: Automatic), without performing switching processing of the display screen (S207), contents change processing of other frames such as acquisition processing and display processing of contents in changed other frames is performed by the data processing part 103 (S208). The reason that no switching processing of the display screen is performed in S207 is that, if the switching processing of the display screen is performed automatically when display contents of a frame change, the screen display will change suddenly for the user. Thus, the user, unable to understand what happened, is confused and the apparatus becomes user-unfriendly.

In S206, when the frame configuration management part 104 judges that the change processing of the display contents of other frames such as user's operation of the operating part 106 or click (selection) operation of an anchor or the like was performed manually, processing is performed so as to display all frames included in the Web data. For example, a source code is rewritten by the data processing part 103, display data based on the source code is output to the display part 105, and the Web data including all frames is displayed on the display part 105 (S209).

Then, the data processing part 103 focuses on the frame where the change processing of the display contents was performed (S210). Specifically, data processing is performed by the data processing part 103 such that which frame is active is indicated by displaying enclosures of the frame with thick lines. Thereafter, frame contents change processing such as acquisition processing and display processing of contents in other frames where the change was made is performed by the data processing part 103 (S211).

Figure 8:
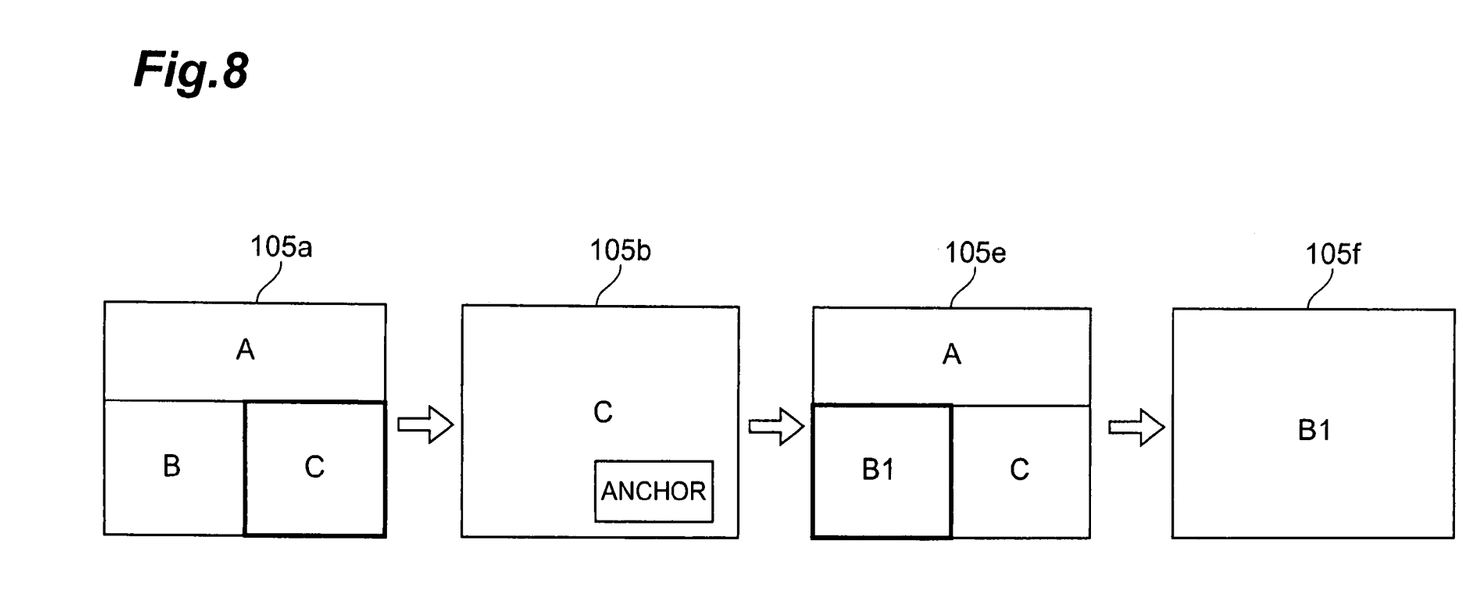
FIG. 8 is an explanatory diagram showing a transition example of display screen when there is change processing of display contents of only other frames except for the Frame C in the state of enlarging to display Frame C.

Here, a transition example of the display screen will be described when transition is illustrated from S201 to S209. FIG. 8 shows a transition example of the display screen when the change processing of the display contents in only other frames (Frame A or B) is performed in the state that Frame C is enlarged for display. The display screen of the display part 105 is shifted to the display screen 105*a*, and then to the display screen 105*b* (refer to S202). Then, when the anchor described in Frame C and shown in the display screen 105*b* is selected by user's operation, a display screen 105*e* is displayed on the display part 105 (refer to S209). The display screen 105*e* is composed of Frame A, Frame B1, and Frame C and Frame B1 is displayed instead of Frame B. Here, when the user makes a selection of enlarged display of Frame B1, Frame B1 is enlarged for display, as shown in a display screen 105*f*.

As described above, when the change processing of the display contents of the frames that are not displayed is performed in the state that only one frame is enlarged for display by the user, the screen display can be switched to make the display more user-friendly in accordance with the change processing of the display contents. Note that, in the present embodiment, the above descriptions are based on enlarged display when only one frame is selected, but it is not limited to this, and it is possible to perform processing of the frame switching in the state that a plurality of frames are enlarged for display, like the case of selecting a plurality of frames. Further, frame enlargement in the present embodiment means that screen data is displayed using the whole display screen of the display part 105, but the frame enlargement is not limited to this and screen data may be displayed by enlarging the frame itself. Furthermore, when, in S203, there are changes in the frame display contents, the display screen may be switched to display all frames without performing judgment processing of automatic/manual in S206.

Next, operation and effects of the mobile device 100 in the present embodiment will be described. In the mobile device 100 of the present embodiment, when Web data including a plurality of frames in which screen data is displayed is received by the data communicating part 101, the frame specified by the user and included in the received Web data is enlarged by the data processing part 103, and screen data of the enlarged frame is displayed on the display part 105 to display the screen data of the frame specified by the user, the frame configuration management part 104 judges whether or not the changes of display contents of other frames that are not displayed took place, when the screen data of the frame specified by the user is displayed. When the frame configuration management part 104 judges that the changes of display contents took place, it is possible to perform data processing by the data processing part 103 so as to cause all frames included in the 25 received Web data to be displayed on the display part 105. Due to this, it is possible to display the screen data of another frame in which some changes took place while one frame is displayed, and the user can immediately know the changes taking place in which frame. Thus, it is possible to provide a user-friendly and easy-to-use communication apparatus.

The frame configuration management part 104 of the mobile device 100 further judges whether the changes took place in the display contents of the frame without user's operation or whether the changes took place in the display contents of the frame due to user's operation. When the frame configuration management part 104 judges that the changes took place in the display contents of the frame due to user's operation, the data processing part 103 causes all frames of the Web data to be displayed on the display part 105. When the frame configuration management part 104 judges that the changes took place in the display contents of the frame without user's operation, the frame specified by the user can be displayed continuously.

Due to this, it is possible to prevent the user from confusing due to a sudden change of screen display when the changes took place in the display contents of the frame without user's operation. Conversely, in the case that the changes took place in the display contents of the frame caused by user's operation, since there is a possibility that the user is aware of the change of screen display, it is possible for the user to be informed of the frame with the changes without any user being confused.

Furthermore, the frame configuration management part 104 of the mobile device 100 judges whether or not the changes took place in the displayed own frame or other frames. The frame configuration management part 104, when judges that the changes took place in the displayed own frame or other frames, causes all frames included in the received Web data to be displayed on the display part 105. Due to this, it is possible to inform the user of the frame with the changes without judging presence/absence of user's operation.

What is claimed is:

1. A mobile communication apparatus, comprising:
   a reception means for receiving Web data divided into a plurality of frames displaying screen data;
   a display means for displaying the screen data while enlarging a frame in response to user specification, the frame being included in the Web data received by the reception means;
   a content judgment means for judging whether or not changes took place in substantive display contents of other frames that are hidden from view by the enlarged frame by determining whether the user pressed an anchor displayed on the enlarged frame, while the screen data of the frame specified by the user specification is displayed with the display means; and
   a data processing means for processing all frames included in the Web data received by the reception means and displaying all frames in which changes took place on the display means in response to the content judgment means judging that changes took place in the display contents,
   wherein the displaying all frames comprises combining at least two or more frames in which changes took place into a composite frame,
   wherein said display means displays the enlarged frame on a whole display screen.

2. The mobile communication apparatus according to claim 1, wherein
   the judgment means further judges whether the frame substantive display contents changed without user operation or whether the frame display contents changed due to user operation; and
   the data processing means:
   when the content judgment means judges that the changes took place in the substantive display contents due to user operation, displaying all frames in which changes took place on the display means; and
   when the content judgment means judges that the changes took place in the substantive display contents of the frame without user operation, displaying the frame specified by the user continuously.

3. The mobile communication apparatus according to claim 2, wherein the content judgment means further judges whether or not changes took place in own frames or other frames displayed with the display means, and the data processing means displays, when the content judgment means judges that the changes took place in the own frames or the other frames, all frames included in the Web data received by the reception means on the display means.

4. A display method of a mobile communication apparatus provided with a display means for displaying received Web data, comprising:
   receiving the Web data divided into a plurality of frames displaying screen data;
   displaying the screen data on the display means while enlarging a frame which is displayed in response to a user specification and is included in the Web data received at the receiving, the enlarged frame displayed on a whole display screen;
   judging whether or not changes took place in substantive display contents of other frames that are hidden from view by the enlarged frame by determining whether the user pressed an anchor displayed on the enlarged frame, while the screen data of the enlarged frame, which is displayed in response to the user specification, is displayed at the displaying; and processing all frames included in the received Web data and displaying all frames in which changes took place on the display means in response to the judging that the changes took place in display contents, wherein the displaying all frames comprises combining at least two or more frames in which changes took place into a composite frame.

5. The display method according to claim 4, wherein the judging further judges whether the frame substantive display contents changed without user operation or whether the frame display contents changed due to user operation; and the displaying further comprising:

when the content judgment step judges that the changes took place in the substantive display contents due to user operation, displaying all frames in which changes took place on the display means;

when the content judgment step judges that the changes took place in the substantive display contents of the frame without user operation, displaying the frame which is in response to a user specification continuously.

6. A mobile communication apparatus, comprising:

a reception unit configured to receive Web data divided into a plurality of frames displaying screen data;

a display unit configured to display the screen data while enlarging a frame which is displayed in response to a user specification and is included in the Web data received by the reception unit;

a content judgment unit configured to judge whether or not changes took place in substantive display contents of other frames that are hidden from view by the enlarged frame by determining whether the user pressed an anchor displayed on the enlarged frame, while the screen data of the enlarged frame, which is displayed in response to the user specification, is displayed with the display unit; and a data processing unit configured to process all frames included in the Web data received by the reception unit and display all frames in which changes took place on the display unit in response to the content judgment unit judging that changes took place in the display contents, wherein the displaying all frames comprises combining at least two or more frames in which changes took place into a composite frame, wherein said display means displays the enlarged frame on a whole display screen.

7. The mobile communication apparatus according to claim 6, wherein the content judgment unit is further configured to judge whether the frame substantive display contents changed without user operation or whether the frame display contents changed due to user operation; and the data processing unit is further configured to:

when the content judgment unit judges that the changes took place in the substantive display contents due to user operation, display all frames in which changes took place on the display unit; and when the content judgment unit judges that the changes took place in the display contents of the frame without user operation, display the frame which is in response to a user specification continuously.

8. The mobile communication apparatus according to claim 6, wherein the content judgment unit is further configured to judge whether or not changes took place in own frames or other frames displayed with the display unit, and the data processing unit displays, when the content judgment unit judge that the changes took place in the own frames or the other frames, all frames included in the Web data received by the reception unit on the display unit.

* * * * *